United States Patent [19]

Kashiwagi

[11] Patent Number: 4,691,147
[45] Date of Patent: Sep. 1, 1987

[54] CIRCUIT ARRANGEMENT FOR CORRECTING HORIZONTAL PINCUSHION DISTORTION USING A VOLTAGE PROPORTIONAL TO VERTICAL SYNC PERIOD

[75] Inventor: Shigeru Kashiwagi, Iwai, Japan
[73] Assignee: Victor Company of Japan, Ltd., Japan
[21] Appl. No.: 872,384
[22] Filed: Jun. 5, 1986

[30] Foreign Application Priority Data

Jun. 6, 1985 [JP] Japan .................................. 60-123215

[51] Int. Cl.[4] .......................................... H01J 29/56
[52] U.S. Cl. .................................................. 315/371
[58] Field of Search ............................... 315/370, 371

[56] References Cited

U.S. PATENT DOCUMENTS 4,645,985 2/1987 Dietz .................................... 315/371

Primary Examiner—Theodore M. Blum
Assistant Examiner—David Cain
Attorney, Agent, or Firm—Lowe, Price LeBlanc, Becker & Shur

[57] ABSTRACT

In a horizontal pincushion distortion correcting circuit using a parabolic wave signal of vertical deflection period for use with CRT drive circuit, a d.c. voltage proportional to vertical deflection period is produced, and then the parabolic wave signal is amplitude-modulated by the d.c. voltage so that a resultant parabolic wave signal has a substantially constant amplitude irrespective of the change in vertical sync frequency. The d.c. voltage may be produced by frequency-converting the vertical sync signal or by detecting an envelope of the horizontal deflection current modulated by the resultant parabolic wave signal.

4 Claims, 8 Drawing Figures

CIRCUIT ARRANGEMENT FOR CORRECTING HORIZONTAL PINCUSHION DISTORTION USING A VOLTAGE PROPORTIONAL TO VERTICAL SYNC PERIOD

BACKGROUND OF THE INVENTION

This invention relates generally to a circuit arrangement for correcting horizontal pincushion distortion in a cathode ray tube drive circuit.

In a wide angle color cathode ray tube (CRT) used in a television set, video display terminal of a computer or the like, when the deflecting coils are designed so that misconvergence is minimum, then the shape of raster obtained on the screen of the CRT does not become a rectangle such that left and right side edges are arcuate inwardly so that so called horizontal pincushion distortion occurs.

In order to correct such horizontal pincushion distortion a correcting circuit is used in a conventional circuit arrangement. Although such conventional circuit arrangement is satisfactory as long as the vertical deflection frequency is constant, desired amount of correction of horizontal pincushion distortion cannot be obtained when the vertical deflection frequency varies.

SUMMARY OF THE INVENTION

The present invention has been developed in order to remove the above-described drawbacks inherent in the conventional circuits for correcting horizontal pincushion distortion.

It is, therefore, an object of the present invention to provide a new and useful horizontal pincushion distortion correcting circuit which is capable of correcting such distortion with high stability even if the vertical deflection frequency assumes various different values.

According to a feature of the present invention, in a horizontal pincushion distortion correcting circuit using a parabolic wave signal of vertical deflection period for use with CRT drive circuit, a d.c. voltage proportional to vertical deflection period is produced, and then the parabolic wave signal is amplitude-modulated by the d.c. voltage so that a resultant parabolic wave signal has a substantially constant amplitude irrespective of the change in vertical sync frequency. The d.c. voltage may be produced by frequency-converting the vertical sync signal or by detecting an envelope of the horizontal deflection current modulated by the resultant parabolic wave signal.

In accordance with the present invention there is provided a circuit arrangement for correcting horizontal pincushion distortion arranged to modulate a horizontal deflection current by a parabolic wave signal of vertical deflection period which parabolic wave signal is obtained by waveform shaping a vertical deflection current flowing through a vertical deflection coil of a deflection yoke of a cathode-ray-tube, said circuit arrangement comprising: first means responsive to vertical synchronous signal for generating a d.c. voltage proportional to the vertical deflection period; second means responsive to said d.c. voltage from said first means for controlling the amplitude of said parabolic wave signal in substantial proportion to said d.c. voltage such that the amplitude of an output parabolic wave signal outputted from said second means is substantially constant irrespective of the variation in vertical deflection frequency; and third means for amplitude-modulating horizontal deflection current by an output parabolic wave signal from said second means.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings

DETAILED DESCRIPTION OF THE INVENTION

Prior to describing preferred embodiments of the present invention, prior art techniques will be described for a better understanding of the present invention.

Figure 6:
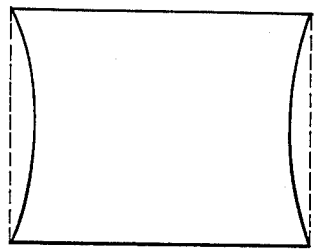
FIG. 6 is a schematic view of raster subjected to horizontal pincushion distortion.

FIG. 6 shows a raster subjected to horizontal pincushion distortion (see solid line).

Figure 7:
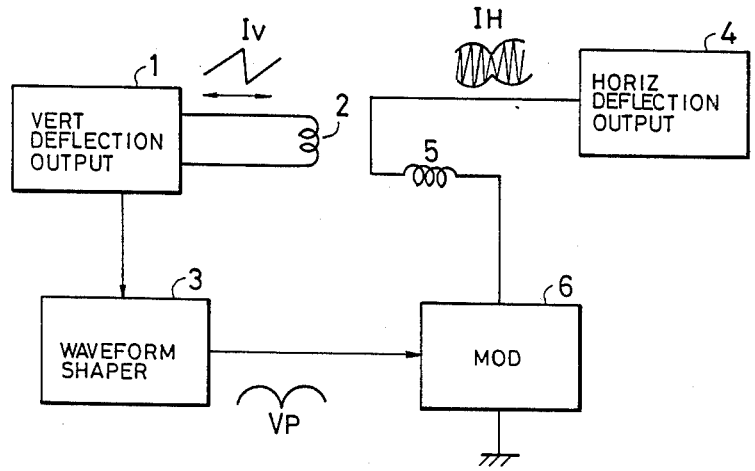
FIGS. 7 and 8 are diagrams showing conventional horizontal pincushion distortion correcting circuits.

FIG. 7 shows a conventional circuit arrangement for correcting horizontal pincushion distortion. In FIG. 7, a vertical deflection output stage 1 causes a sawtooth wave vertical deflection current Iv to flow via a vertical deflection coil 2 attached to a neck of an unshown CRT. Thus, vertical deflection is performed. The vertical deflection current Iv is fed to a waveform shaper 3 which produces a parabolic wave signal Vp of vertical deflection frequency.

On the other hand, a horizontal deflection output stage 4 causes a sawtooth wave horizontal deflection current $I_H$ to flow via horizontal deflection coil 5 attached to the neck of the CRT. Thus, horizontal deflection is performed. The horizontal deflection current $I_H$ is fed to a modulator 6 whose one terminal is grounded. The parabolic wave signal from the waveform shaper 3 is fed to the modulator 6 so as to amplitude-modulate the horizontal deflection current $I_H$ by the parabolic wave Vp such that an envelope of the sawtooth wave horizontal deflection current $I_H$ becomes the parabolic wave Vp of vertical deflection frequency. As a result, the horizontal pincushion distortion shown in FIG. 6 is corrected.

In this way, horizontal pincushion distortion is corrected by the conventional circuit arrangement as long as the vertical deflection frequency is constant. However, when it is intended to use such CRT drive circuit with various different vertical deflection frequencies, the amplitude of the parabolic waves Vp is inverse proportion to the vertical deflection frequency, and thus desired correction of horizontal pincushion distortion cannot be achieved.

This point will be further described in detail with reference to FIG. 8. The vertical deflection coil 2 is connected to an output terminal of the vertical deflection output stage 1 at its one end is connected at its other end via a capacitor C to ground. A voltage developed across the capacitor C is used as the above-mentioned parabolic wave signal.

Figure 8:
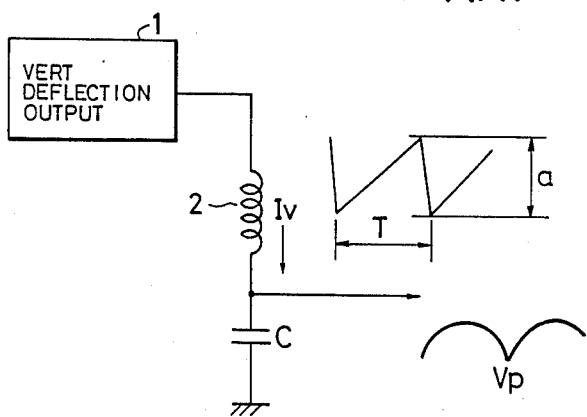

In the arrangement of FIG. 8 an instantaneous value i of the vertical deflection current Iv flowing through the vertical deflection coil 2 is given by:

$$i = (a/T) \cdot t \qquad (1)$$

wherein
a is the amplitude of the sawtooth wave;
T is the period of the vertical deflection; and
t is time.

Therefore, the voltage Vc developed across the capacitor C is given by:

$$Vc = \{1/(CT)\} \cdot \int i dt \qquad (2)$$
$$= \{a/(2CT)\} \cdot t^2$$

Since zero peak value Vp of this voltage Vp is given as a voltage at the time when t=t/2, Vp is given by:

$$Vp = [Vc] \, t = T/2 \qquad (3)$$
$$= aT/(8C)$$

The amplitude of the above-mentioned parabolic wave having a peak value Vp is in proportion to the vertical deflection period. In other words, the amplitude of the parabolic wave is inverse proportion to the vertical deflection frequency.

In another conventional circuit arrangement for correcting horizontal pincushion distortion, the amplitude of the parabolic wave of vertical deflection frequency necessarily changes as long as integration is used. Therefore, such conventional circuit arrangements cannot be used for satisfactorily correcting horizontal pincushion distortion without adjustment which is required each time vertical deflection frequency changes.

Especially, since there are various values of vertical deflection frequency in CRTs used as computer displays for example from 40 Hz to 90 Hz, the development of horizontal pincushion distortion correcting circuit, which is capable of automatically correcting horizontal pincushion distortion without adjustment for various vertical deflection frequencies, has hitherto been desired.

Figure 1:
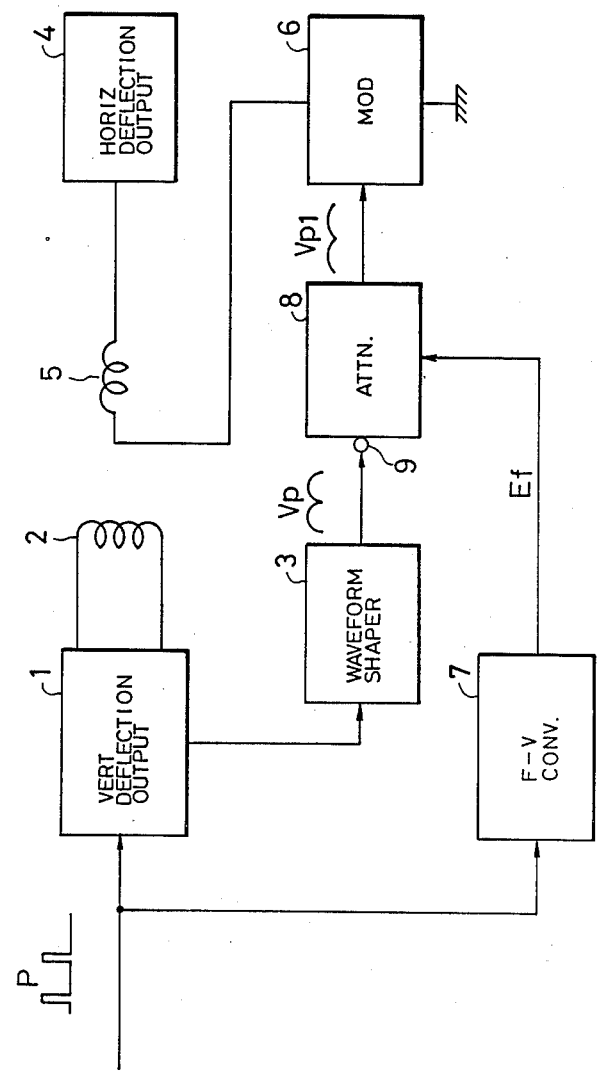
FIG. 1 is a schematic block diagram showing an embodiment of the circuit arrangement according to the present invention.

Reference is now made to FIG. 1 showing a block diagram of an embodiment of the circuit arrangement according to the present invention. A vertical synchronous signal P supplied from an unshown previous stage is fed to the vertical deflection output stage 1 to cause the same to produce a sawtooth wave vertical deflection current Iv synchronized with the vertical sync signal P. The vertical sync signal P is also fed to a frequency-to-voltage (F-V) converter 7 which produces a d.c. voltage Ef whose voltage value varies in accordance with the frequency of the vertical sync signal P.

A vertical deflection current from the vertical deflection output sage 1 is fed to a waveform shaper 3 in which a parabolic wave signal Vp of vertical deflection frequency is produced in the same manner as in the conventional arrangement of FIG. 7. The parabolic wave signal Vp from the waveform shaper 3 is fed to an electronic attenuator 8 which is responsive to the d.c. voltage Ef from the F-V converter 7. More specifically, the parabolic wave signal Vp from the waveform shaper 3 is attenuated in accordance with the d.c. voltage Ef so as to produce a parabolic wave signal Vp1 whose amplitude is constant irrespective of the frequency of the vertical sync signal P, i.e. vertical deflection frequency. This parabolic wave signal Vp1 outputted from the electronic attenuator 8 is fed to an amplitude modulator 6 so as to amplitude modulate horizontal deflection current $I_H$ flowing via horizontal deflection coil 5. Therefore, the amount of correction of the horizontal pincushion distortion is substantially constant irrespective of the vertical deflection frequency.

Figure 2:
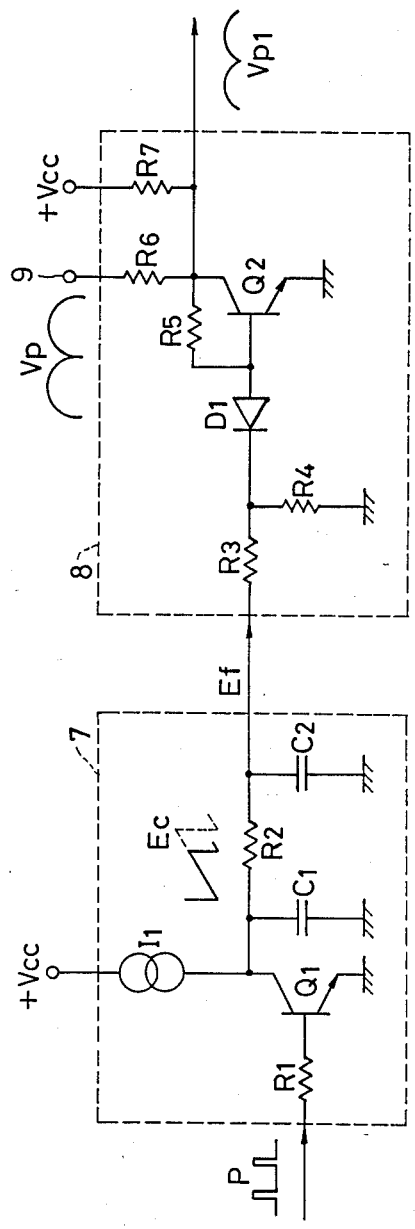
FIG. 2 is a circuit diagram showing important portion in the block diagram of FIG. 1.

FIG. 2 is a circuit diagram showing actual circuit arrangement of the F-V converter 7 and the electronic attenuator 8 shown in FIG. 1. The F-V converter 7 comprises an NPN transistor Q1 of grounded emitter circuit, a base resistor R1 therefor, a current source I1 connected to collector of the same, and a smoothing circuit having two capacitors C1 and C2 whose one terminal is grounded and a resistor R2 interposed between the two capacitors C1 and C2. A junction of the capacitor C1 and the resistor R2 is connected to collector of the transistor Q1.

The electronic attenuator 8 has substantially the same structure as that disclosed in Japanese Patent Publication No. 53-44100. More specifically, the electronic attenuator 8 comprises a series circuit of an input resistor R3 connected at its one terminal to an input terminal of the electronic attenuator 8 and a diode D1, a resistor R4 connected at its one terminal to a junction of the resistor R3 and the diode D1 and to ground at the other terminal, an NPN transistor Q2 of grounded emitter connection whose base is connected to anode of the diode D1, a base bias resistor R5 interposed between base and collector of the transistor Q2, a resistor R6 interposed between a terminal 9 and collector of the transistor Q2, and a collector load resistor R9 interposed between collector of the transistor Q2 and a d.c. voltage source +Vcc.

The circuit of FIG. 2 operates as follows:

When the above-mentioned vertical sync signal P is inputted via the resistor R1 to the transistor Q1 of the F-V converter 7, the transistor Q assumes on and off states alternately in accordance with the vertical sync signal P. When transistor Q turns on in response to positive-going pulse of the vertical sync signal P, the potential at the collector of the transistor Q1 becomes substantially zero since the current source I1 connected to a d.c. voltage source +Vcc is now grounded at the other terminal. When the positive-going pulse of the vertical sync signal P disappears, the transistor Q1 turns on to charge the capacitor C1 with a charging current from the d.c. current source I1 connected to the d.c. voltage source +Vcc. Thus the collector voltage Ec of the transistor Q1 linearly increases.

In the presence of a subsequent positive-going pulse of the vertical sync signal P the transistor Q1 turns on gain, then the charge stored in the capacitor C1 is discharged via the collector-emitter path of the transistor Q1. As a result, the collector voltage Ec becomes a sawtooth wave where its peak value increases in proportion to the period of the vertical sync signal P. Therefore, an output d.c. voltage Ef obtained by smoothing the sawtooth wave collector voltage Ec by the smoothing circuit having the resistor R2 and the capacitor C2 is inverse proportion to the vertical deflection frequency.

The output d.c. voltage Ef from the F-V converter 7 fed via the series circuit of the resistor R3 and the diode D1 to base of the transistor Q2 of the electronic attenuator 8. An equivalent resistance between emitter and collector of the transistor Q2 varies in accordance with the incoming base voltage, and collector voltage vs collector current characteristic (Vc-Ic curve) becomes linear as shown in FIG. 4. Furthermore, the inclination of the Vc-Ic curve continuously changes depending on the mgnitude of the d.c. voltage Ef. More specifically, when the d.c. voltage Ef increases in proportion to the vertical deflection period T, the inclination or slope of the Vc-Ic curve becomes steep. This correspohds to, the reduction in the equivalent collector-emitter resistance of the transistor Q2. Therefore, it will be understood that voltage-dividing ratio between the resistor R6 and the equivalent resistance of the collector-emitter path of the transistor Q2 changes such that the latter resistance decreases as the vertical deflection period increases. Thus, even if the amplitude of the parabolic wave Vp supplied from the terminal 9 increases in response to the increase in the vertical deflection period T, the amplitude an output parabolic wave Vp1 developed across collector-emitter path of the transistor Q2 is kept constant irrespective of the variation in the vertical deflection period T. This parabolic wave Vp1 whose amplitude is kept constant is fed to the modulator 6 of FIG. 1. As such a modulator may be used one using a saturable reactor or one arranged to modulate power source voltage of a horizontal output stage. One example of the modulator 6 is shown in FIG. 3 illustrating another embodiment of the present invention.

Figure 3:
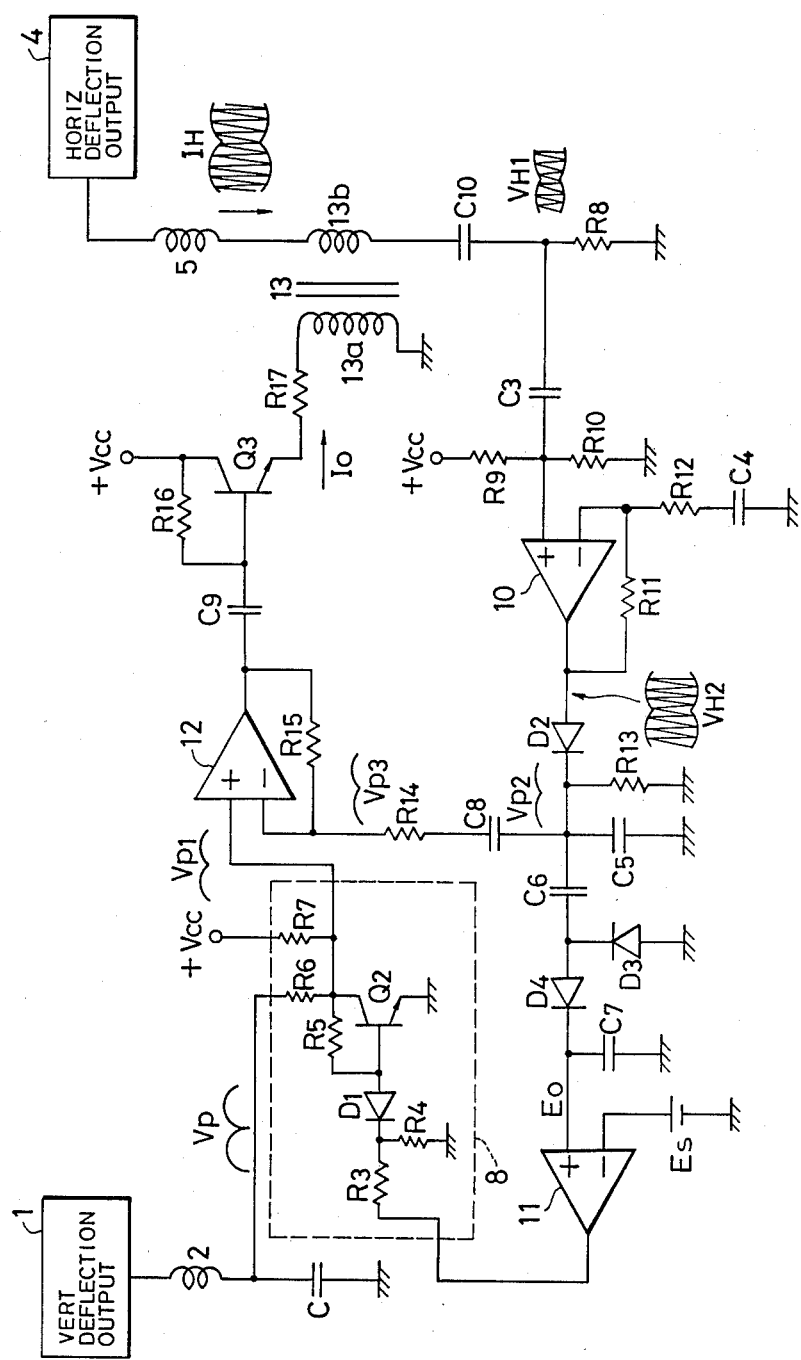
FIG. 3 is a schematic block diagram showing a second embodiment of the circuit arrangement according to the present invention.
Figure 4:
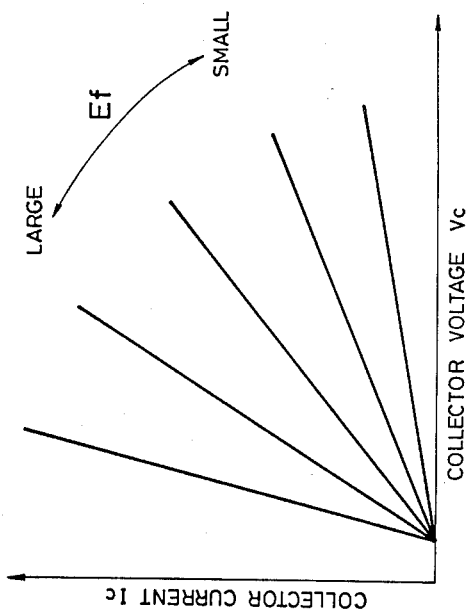
FIG. 4 is a graph for describing the operation of an electronic attenuator shown in FIG. 2.

Referring now to FIG. 3, another embodiment of the present invention will be described. A resistor R8 is connected in series with the horizontal deflecting coil 5 to convert horizontal deflection current $I_H$ into a voltage $VH_1$ The resistor R8 is connected in series via capacitor C10 and a controlled winding 13b of a saturable reactor 13 to the horizontal delecting coil 5. A junction of the capacitor C10 and the resistor R8 is connected via a coupling capacitor C3 to a noninverting input terminal + of an operational amplifier 10. A series circuit of two resistors R9 and R10 is interposed between a d.c. voltage source + Vcc and ground so that a junction of the two resistors R9 and R10 is connected to the noninverting input terminal + to supply bias voltage. A resistor R11 is connected between an inverting input terminal— and an output terminal of the operational amplifier 10, while a series circuit of a resistor R12 and a capacitor C4 is interposed between the inverting input terminal— and ground. These resistors R11 and R12 are used for determining the amount of feedback for the operational amplifier 10, while the capacitor C4 is used for blocking d.c. With this arrangement, a voltage $V_{H2}$ corresponding to an amplified a.c. component of the voltage $V_{H1}$ appears at the output terminal of the operational amplifier 10.

This voltage $V_{H2}$ is fed via a diode D2 to a charging resistor R13 and a capacitor C5 connected in parallel with the charging resistor R13 so that envelope of the voltage $V_H$ is detected. As a result, a parabolic wave Vp2 which is proportional to the parabolic wave modulation component of the vertical deflection period flowing through the horizontal deflecting coil 5 can be obtained across the capacitor C5. This parabolic wave Vp2 is then converted into a d.c. voltage Eo which is in proportion to the peak-to-peak value of the parabolic wave Vp2 by a coupling capacitor C6, and a rectifier circuit having two diodes D3 and D4 and a smoothing capacitor C7. This d.c. voltage Eo is fed to a noninverting input + of an operational amplifier 11 whose inverting input terminal—is supplied with a reference voltage Es. Thus, the d.c. voltage Eo is compared with the reference voltage Es so as to supply a following electronic attenuator 8 with a signal proportional to the difference between Eo and Es.

The electronic attenuator 8 is arranged to control the amplitude of the incoming parabolic wave Vp from the vertical output stage 1 in accordance with the d.c. voltage from the operational amplifier 11 in the same manner as described in the previous embodiment so that an output parabolic wave Vp1 having a constant amplitude is obtained. This parabolic wave Vp1 is fed to a noninverting input terminal + of an operational amplifier 12. On the other hand, the parabolic wave Vp2 developed across the capacitor C5 is fed via a series circuit of a capacitor C8 and a resistor R14 to an inverting input terminal—of the operational amplifier 12 as a parabolic wave Vp3. A resistor R15 interposed between the inverting input—and an output terminal of the operational amplifier 12 is a feedback resistor used for.ensuring stable operation of the operational amplifier 12. An output signal from the operational amplifier 12 is fed via a capacitor C9 to base of a transistor Q3 of emitter-follower connection. A resistor R16 is a base bias resistor, and a series circuit of a resistor R17 and a control winding 13a of the saturable reactor 13 is connected to emitter of the transistor Q3 as its emitter load.

Figure 5:
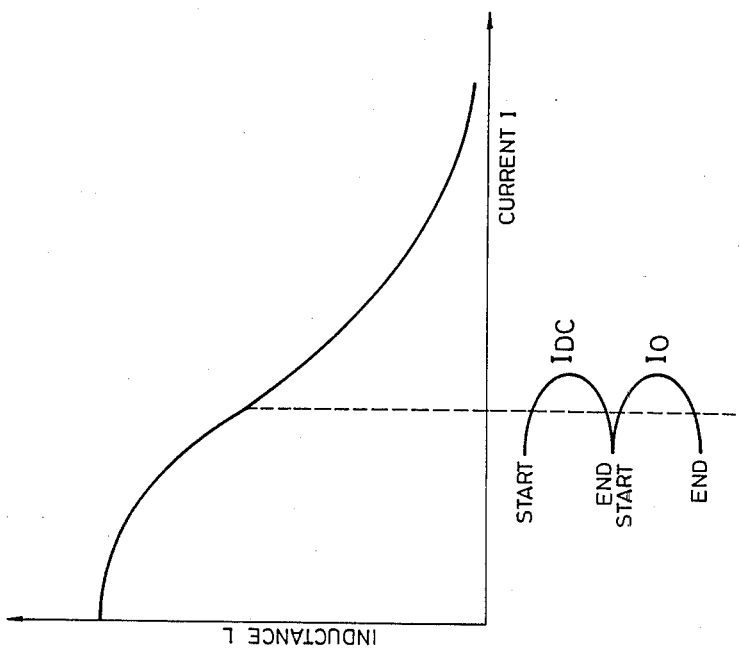
FIG. 5 is a graph for describing the operation of a saturable reactor shown in FIG. 3.

A current Io corresponding to the sum of a.c. component of vertical deflection period and a d.c. component $I_{DC}$ to be similar to a parabolic wave flows via the control winding 13a as shown in FIG. 5. On the other hand, the inductance L of the controlled winding of the saturable reactor 13 varies in accordance with the value of the current Io flowing through the control winding 13a as shown in FIG. 5. As a result, the inductance is large at the beginning and end in the vertical deflection period while the inductance is small in the middle of the same. Since the controlled winding 13b is connected in series to the horizontal deflection coil 5, the peak-to-peak value of the horizontal deflection current becomes smaller and smaller as the inductance L becomes larger and larger. As a result, the horizontal width of the raster becomes smaller following the peak-to-peak value. In this way, the horizontal width of the raster on the CRT screen becomes shorter than before at the top and bottom thereof, while the width becomes larger than before at the middle. Thus, horizontal pincushion distortion is corrected.

The capacitor C10 connected in series to the controlled winding 13a is used for S correction with which the sawtooth wave horizontal deflection current $I_H$ is corrected to be S-shaped so as to improve linearity of the picture.

In the circuit of FIG. 3, it is arranged such that the two input signals Vp1 and Vp3 respectively fed to the operational amplifier 12 agree with each other in connection with their amplitude and phase. In other words, the operational amplifier 12, the saturable reactor 13, the operational amplifier 10 and the envelope detector form a feedback loop so that the difference between the two parabolic wave signals Vp1 and Vp3 is as small as possible. This technique of modulating the horizontal deflection current by a parabolic wave signal is disclosed in Japanese Patent Provisional Publication (number thereof being not yet known, the application being filed Sept. 4, 1984 with application No. 59-193364). More specifically, since the parabolic wave $V_P3$ is in proportion to the envelope waveform of the horizontal deflection current $I_H$ modulated at vertical deflection period, the envelope waveform of the horizontal deflection current $I_H$ is necessarily in proportion to the parabolic wave Vp1.

Therefore, if the signal Vp1 is always of a predetermined parabolic wave, the envelope waveform of the above-mentioned $I_H$ is necessarily of a parabolic wave. Therefore, accurate correction of horizontal pincushion distortion can be achieved. Furthermore, even if the transistor Q3 or the saturable reactor 13 has slight non-linear characteristic or temperature-dependent or frequency-dependent characteristic, the operation of the circuit is not affected by such factors.

The circuit of FIG. 3 operates so that d.c. voltage Eo corresponding to the peak-to-peak value of the parabolic wave Vp2 agrees with the reference voltage Ex. Therefore, the amount of the parabolic wave component, which modulates the horizontal deflection current $I_H$ is always consstant. Assuming that the vertical deflection frequency is switched to a lower frequency, the amplitude of the parabolic wave Vp increases. At this time, however, the amplitude of the parabolic wave component of the horizontal deflection current $I_H$, the amplitude of the parabolic wave Vp2 or the d.c. voltage Do cannot increase. If the d.c. voltage Eo is going to increase beyond the reference voltage Es, the amplitude of the output signal from the operational amplifier 11 suddenly increases so as to change the voltage dividing ratio or attenuation factor at an output portion of the electronic attenuator as described in the above. As a result, the amplitude of the parabolic wave Vp1 is rendered constant and thus, the amount of the parabolic wave of the horizontal deflection current 2, i.e. the amount of correction of the horizontal deflection current or the amount of correction of the horizontal pincushion distortion are unchanged to assume the same values as before.

The above-described embodiments are just examples of the present invention, and therefore, it will be apparent for those skilled in the art that many modifications and variations may be made without departing from the scope of the present invention.

What is claimed is:

1. A circuit arrangement for correcting horizontal pincushion distortion arranged to modulate a horizontal deflection current by a parabolic wave signal of vertical deflection period which parabolic wave signal of obtained by waveform shaping a vertical deflection current flowing through a vertical deflection coil of a deflection yoke of a cathode-ray-tube, said circuit arrangement comprising:
   (a) first means responsive to vertical synchronous signal for generating a d.c. voltage proportional to the vertical deflection period;
   (b) second means responsive to said d.c. voltage from said first means for controlling the amplitude of said parabolic wave signal in substantial proportion to said d.c. voltage such that the amplitude of an output parabolic wave signal outputted from said second means is substantially constant irrespective of the variation in vertical deflection frequency; and
   (c) third means for amplitude-modulating horizontal deflection current by an output parabolic wave signal from said second means.

2. A circuit arrangement as claimed in claim 1, wherein said second means comprises and electronic attenuator arranged to vary its attenuation rate in accordance with said d.c. voltage from said first means.

3. A circuit arrangement as claimed in claim 1, wherein said said first means comprises a frequency-to-voltage converter comprising:
   (a) a charging circuit arranged to charge a capacitor with a current in response to said vertical synchronous signal; and
   (b) a smoothing circuit for smoothing a voltage developed across said capacitor for producing said d.c. voltage.

4. A circuit arrangement as claimed in claim 1, wherein said said first means comprises:
   (a) an envelope detector responsive to said horizontal deflection current for producing an envelope signal;
   (b) a rectifying and smoothing circuit responsive to said envelope signal for producing a d.c. voltage; and
   (c) a comparator responsive to said d.c. voltage and a reference d.c. voltage for producing an output signal, as said d.c. voltage, corresponding to the difference between its two input d.c. voltage.

* * * * *